(12) United States Patent
Wei (10) Patent No.: US 11,494,961 B2
(45) Date of Patent: Nov. 8, 2022

(54) STICKER GENERATING METHOD AND APPARATUS, AND MEDIUM AND ELECTRONIC DEVICE

(71) Applicant: BEIJING BYTEDANCE NETWORK TECHNOLOGY CO., LTD., Beijing (CN)

(72) Inventor: Yantong Wei, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/560,140

(22) Filed: Dec. 22, 2021

(65) Prior Publication Data

US 2022/0139016 A1 May 5, 2022

Related U.S. Application Data (63) Continuation of application No. PCT/CN2020/091805, filed on May 22, 2020.

(30) Foreign Application Priority Data

Jun. 25, 2019 (CN) .......................... 201910556164.5

(51) Int. Cl.
*G06T 7/11* (2017.01)
*G06T 7/20* (2017.01)
(Continued)

(52) U.S. Cl.
CPC ............... *G06T 11/60* (2013.01); *G06T 7/11* (2017.01); *G06T 7/20* (2013.01); *G06T 7/246* (2017.01);
(Continued)

(58) Field of Classification Search
CPC ... G06T 11/60; G06T 7/11; G06T 7/20; G06T 2207/20101; G06T 2207/30201;
(Continued)

(56) References Cited

U.S. PATENT DOCUMENTS

| 2012/0139832 A1* | 6/2012 | Hu ....................... G06V 40/168 345/156 |
| 2018/0234708 A1* | 8/2018 | Chong ................. H04N 21/472 |

(Continued)

FOREIGN PATENT DOCUMENTS

| CN | 107343225 A | 11/2017 |
| CN | 108846878 A | 11/2018 |
| CN | 109191544 A | 1/2019 |

OTHER PUBLICATIONS

International Patent Application No. PCT/CN2020/091805; Int'l Written Opinion and Search Report; dated Aug. 24, 2020; 5 pages.

*Primary Examiner* — Jon Chang
(74) *Attorney, Agent, or Firm* — BakerHostetler (57) ABSTRACT

A sticker generating method is provided. The method includes: acquiring a background image, where the background image includes a target object; displaying a display area of a sticker and an anchor point of the sticker in the background image; receiving an import instruction for the sticker; importing a resource of the sticker according to the import instruction and displaying the resource of the sticker in the display area of the sticker; dynamically selecting a tracking area based on a position of the anchor point of the sticker, where the tracking area is an image area in the target object; and generating the sticker based on the display area, the tracking area, and the resource of the sticker.

19 Claims, 7 Drawing Sheets

(51) Int. Cl.
  *G06T 7/246*  (2017.01)
  *G06T 7/70*  (2017.01)
  *G06T 11/60*  (2006.01)

(52) U.S. Cl.
  CPC ...... *G06T 7/70* (2017.01); *G06T 2207/20101* (2013.01); *G06T 2207/30201* (2013.01)

(58) Field of Classification Search
  CPC ........... G06T 11/00; G06T 7/246; G06T 7/70; G06V 40/161; G06V 40/168; G06K 9/00
  See application file for complete search history.

(56) References Cited

U.S. PATENT DOCUMENTS

2018/0253824 A1   9/2018  Zhong
2020/0177823 A1*  6/2020  Zhu ..................... G06T 11/60
2021/0366163 A1* 11/2021  Lin .................... G06F 3/04845

\* cited by examiner

STICKER GENERATING METHOD AND APPARATUS, AND MEDIUM AND ELECTRONIC DEVICE

CROSS REFERENCE TO RELATED APPLICATION

The present application is a continuation of International Patent Application No. PCT/CN2020/091805, filed on May 22, 2020, which claims priority to Chinese Patent Application No. 201910556164.5, titled "STICKER GENERATING METHOD AND APPARATUS, AND MEDIUM AND ELECTRONIC DEVICE", filed on Jun. 25, 2019 with the China National Intellectual Property Administration, both of which are incorporated herein by reference in their entireties.

FIELD

The disclosure relates to the field of computer technology, and in particular to a sticker generating method, a sticker generating device, a medium and an electronic device.

BACKGROUND

With the development of mobile Internet technology, especially the development of images, image processing and image recognition are becoming more and more intelligent, and various beauty cameras and special effect software are becoming more and more popular. In order to diversify image effects, people may set some special effects on an image to increase an interest of the image. Currently, the sticker special effect is very popular, such as setting cat ears or cat whiskers on a human face.

At present, when making a 2D sticker special effect, it is necessary to set two key points on the human face, so that the 2D sticker can track these two key points to track the motion of the human face. However, sometimes the two key points manually set are not accurate and cannot adapt to various situations. For example, the 2D sticker is a hat, and the two key points to be tracked are eyes, when the person lowers his head, the key points being the eyes cannot be detected, it may lead to a case that human face cannot be tracked.

SUMMARY

In order to track the human face more accurately and accurately set a position of the sticker with respect to the human face, the purpose of the disclosure is to provide a sticker generating method, a sticker generating device, a medium and an electronic device, to solve at least one of the above-mentioned technical problems.

A sticker generating method is provided according to an embodiment of the disclosure. The sticker generating method includes: acquiring a background image, where the background image includes a target object; displaying a display area of a sticker and an anchor point of the sticker in the background image; receiving an import instruction for the sticker; importing a resource of the sticker according to the import instruction and displaying the resource of the sticker in the display area of the sticker; dynamically selecting a tracking area based on a position of the anchor point of the sticker, where the tracking area is an image area in the target object; and generating the sticker based on the display area, the tracking area, and the resource of the sticker.

In another aspect, a sticker generating device is provided according to an embodiment of the disclosure. The sticker generating device includes: a background acquiring unit, configured to acquire a background image, where the background image includes a target object; a sticker displaying unit, configured to display a display area of a sticker and an anchor point of the sticker in the background image; an instruction receiving unit, configured to receive an import instruction for the sticker; a sticker importing unit, configured to import a resource of the sticker according to the import instruction and display the resource of the sticker in the display area of the sticker; an area selecting unit, configured to dynamically select a tracking area based on a position of the anchor point of the sticker, where the tracking area is an image area in the target object; and a sticker generating unit, configured to generate the sticker based on the display area, the tracking area, and the resource of the sticker.

In another aspect, an electronic device is provided according to an embodiment of the disclosure. The electronic device includes: one or more processors; and a storage device storing one or more programs. The one or more programs, when executed by the one or more processors, cause the one or more processors to implement the sticker generating method described above.

BRIEF DESCRIPTION OF THE DRAWINGS

In order to more clearly describe the technical solutions in the embodiments of the disclosure or the technical solutions in the conventional technology, drawings to be used in the description of the embodiments of the disclosure or the conventional technology are briefly described hereinafter. It is apparent that the drawings described below show merely some embodiments of the disclosure, and those skilled in the art may obtain other drawings according to the provided drawings without any creative effort. In the drawings.

DETAILED DESCRIPTION

Hereinafter, embodiments of the disclosure are described in detail with reference to the drawings. Although some embodiments of the disclosure are shown in the drawings, it should be understood that the disclosure can be implemented in various forms and should not be construed as being limited to the embodiments set forth herein. On the contrary, these embodiments are provided for more thorough and complete understanding of the disclosure. It should be understood that the drawings and embodiments of the disclosure are only used for exemplary purposes, and are not used to limit the protection scope of the disclosure.

It should be understood that the steps recorded in the method embodiment of the disclosure may be executed in a different order, and/or executed in parallel. In addition, the method embodiment may include additional steps and/or omit some illustrated steps. The scope of the disclosure is not limited in this respect.

The term "including" and its variants as used herein are open-ended, that is, means "including but not limited to". The term "based on" means "based at least in part on". The term "an embodiment" means "at least one embodiment". The term "another embodiment" means "at least one another embodiment". The term "some embodiments" means "at least some embodiments". Related definitions of other terms are given in the following description. It should be noted that the concepts of "first" and "second" mentioned in the disclosure are only used to distinguish different devices, modules or units, and are not used to limit the order of functions performed by these devices, modules or units, and are not used to limit interdependence among these devices, modules or unit.

It should be noted that the term "a" and "multiple" mentioned in the disclosure are illustrative and not restrictive. Those skilled in the art should understand that the term "a" and "multiple" should be understood as "one or more" unless otherwise clearly indicated in the context.

The names of messages or information exchanged between multiple devices in the embodiments of the disclosure are only used for illustrative purposes, and are not used to limit the scope of these messages or information.

It should be noted that, terms "include", "comprise" or any other variants are intended to be non-exclusive. Therefore, an article or apparatus including multiple elements includes not only the elements but also other elements that are not enumerated, or also include the elements inherent for the article or apparatus. Unless expressively limited otherwise, an element defined by a statement "comprising (including) a . . . " does not exclude other same element that may exist in the article or apparatus including such element.

It is to be noted that, various aspects of the embodiments within the scope of the appended claims are described below. It is apparent that the aspects described herein can be embodied in a variety of forms, and any specific structure and/or function described herein are only illustrative. Based on the disclosure, those skilled in the art should understand that an aspect described herein can be implemented independently from any other aspects, and two or more of these aspects can be combined in various ways. For example, any number of aspects set forth herein can be used to implement devices and/or to practice methods. In addition, other structures and/or functionalities other than one or more of the aspects set forth herein may be used to implement the device and/or to practice the method.

It is to be noted that, the drawings illustrated with the following embodiments are only intended to illustrate the basic concepts of the disclosure by way of example. The drawings only show the components related to the disclosure, which are not necessarily drawn as the actual quantity, shape and scale adopted in practice. The actual form, quantity and proportion of each component can be adjusted as desired in an actual implementation, in which the components may be arranged even more complicated.

Furthermore, details in the following description are for a purpose of a thorough understanding of the embodiments. However, it is to be understood by those skilled in the art that an aspect of the disclosure may be practiced without these details.

The optional embodiments of the disclosure will be described in detail below with reference to the drawings.

Embodiment 1

Figure 1:
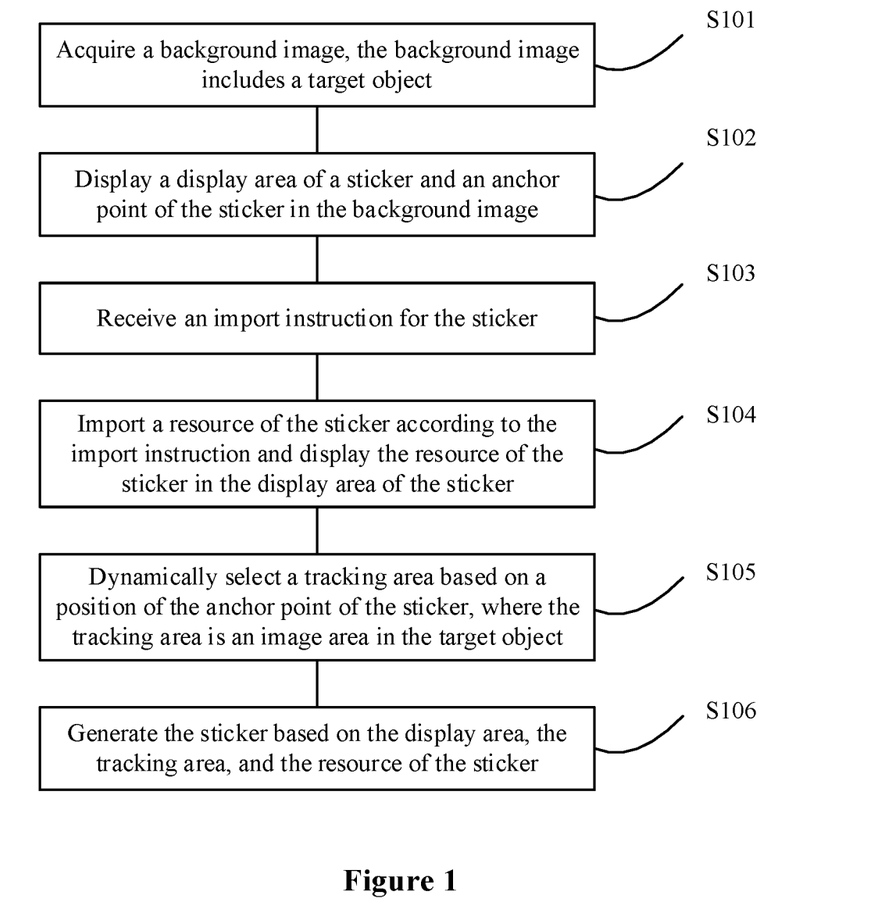
FIG. 1 is a flowchart of a sticker generating method according to an embodiment of the disclosure.

FIG. 1 is a flowchart of a sticker generating method according to an embodiment of the disclosure. The sticker generating method according to this embodiment is used to set a sticker special effect on a head portrait of a two-dimensional image. The sticker generating method is performed by an image processing device. The image processing device may be implemented as software, or as a combination of software and hardware. The image processing device may be integrated in a device in an image processing system, such as an image processing server or an image processing terminal device. As shown in FIG. 1, the method includes following steps S101 to S106.

Step S101, acquire a background image, the background image includes a target object. The image in this embodiment may be a static picture, a dynamic picture, or a video stream or real-time video shooting. The image includes the target object on which a sticker special effect is to be set. Normally, the target object may be the face or head of a person or an animal. The image processing device receives an image acquisition instruction from a client, and then invokes an image or a camera device, to obtain the background image to be processed. The background image may be a stored picture or video, or a picture or video taken in real time, on which a sticker is to be set.

Step S102, display a display area of a sticker and an anchor point of the sticker in the background image. In the embodiment of the disclosure, a human face is selected as the background image. The sticker effect is actually to paste some pictures on the human face, positions of these pictures are changed based on the position of the human face. The position of the sticker is dynamically adjusted based on a result of human face detection, to achieve a simple real-time dynamic sticker effect. The position of the sticker is determined based on the anchor point of the sticker, and the position of the sticker on a canvas is determined based on the position of the anchor point on the canvas, thereby determining a position of the sticker with respect to the background image. In this embodiment, the center point of a rectangular area where the sticker is located or an end point of the rectangular area is defined as the anchor point of the sticker. Coordinates of the anchor point in the image are set to be O(x0, y0), and the set anchor point may be dragged. The position of the anchor point may be set in advance according to the type of the sticker. This embodiment describes how to set a position of an anchor point with respect to the target object, and update the position of the anchor point in real time. If multiple stickers are set, multiple anchor points need to be set.

Figure 2:
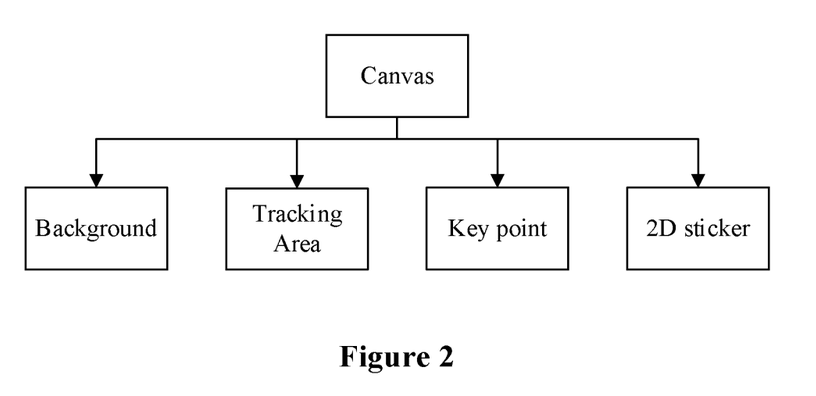
FIG. 2 is a schematic diagram shows a meaning of a canvas according to an embodiment of the disclosure.
Figure 3:
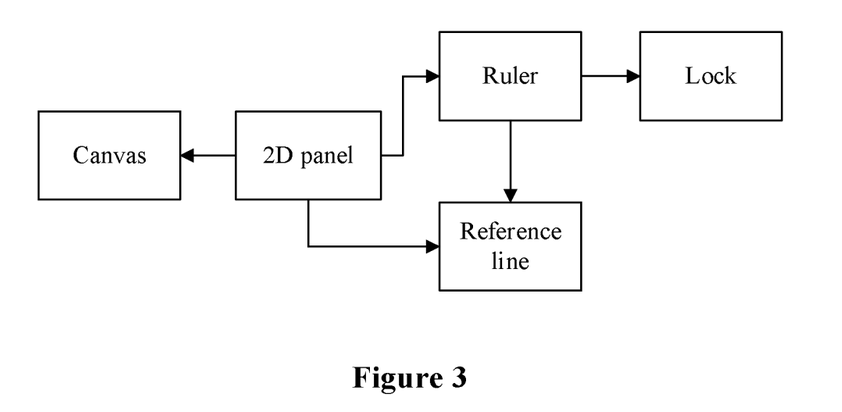
FIG. 3 is a schematic diagram shows elements of a 2D panel according to an embodiment of the disclosure.

In step S103, the background is updated in real time, an import instruction for the sticker is received. Here, two keywords, i.e., canvas and 2D panel, are first introduced. FIGS. 2 and 3 show the element definition diagrams of the canvas and the 2D panel respectively. The canvas is an editable image area and image element, as shown in FIG. 2, the canvas includes a background image, key points, a tracking area, a sticker, or the like. The 2D panel includes a canvas, a ruler, a reference line, a lock, or the like. The position of the sticker on the canvas is set by a user, the sticker may be moved arbitrarily within the canvas, and the sticker may be dragged and scaled arbitrarily within the canvas. Based on the anchor point of the sticker obtained in step S103, a sticker setting instruction sent by the client is received, and an initial position of the anchor point of the sticker is set by the user. The initial position of the anchor point of the sticker refers to an initial coordinate O(x0, y0) of the anchor point. The set anchor point can be dragged, and the position of the anchor point may be set in advance based on a type of the sticker.

Step S104, import a resource of the sticker according to the import instruction and display the resource of the sticker in the display area of the sticker. The stickers may be various, such as cat ears, cat whiskers, rabbit ears, horns, hats, decorations, graffiti. The type of the sticker includes a single picture and a sequence of frame animations. The display mode of the sticker is one of forward display, reverse display, display depending on angle, horizontal mirror display, and vertical mirror display. One or more stickers may be set. Multiple stickers may be set with a display mode of the horizontal mirror display or the vertical mirror display. Multiple stickers may also be rotated arbitrarily for a certain angle, that is the stickers are set with a certain angle of inclination. If the background image is a video, setting of a time sequence of the stickers may be made based on the time sequence of frames of the video. Of course, the setting has a certain degree of freedom and personalization. The sticker is imported into the background image, and the sticker is displayed in the target object of the background image according to a setting instruction. For example, cat whisker stickers are displayed mirrored and symmetrically on both sides of the mouth. The cat whisker stickers correspond to two rectangular sticker display areas, the sticker display areas are located within the target object. In addition, cat ear stickers are displayed mirrored and symmetrically on both sides of the head. The cat ear stickers correspond to two rectangular sticker display areas, the sticker display areas are located outside the target object.

After the sticker is displayed in the background image, a position adjustment and size scaling instruction for the sticker is received. The position and size of the sticker are set according to the needs of the user. For example, the sticker may be set on the top of the head, on the mouth, or in other positions, and the size of the sticker may also be adjusted. The position and size of the sticker may be adjusted by dragging the sticker. The sticker may be dragged at any point within the canvas, and may be dragged in the 2D panel. Dragging of the sticker may adsorb the reference line, which includes boundary adsorption and central axis adsorption. Dragging of the sticker includes two modes: arbitrary dragging and restricted dragging. The restricted dragging includes X direction dragging, Y direction dragging, XY direction dragging and YX direction dragging. The setting of the sticker is implemented on the 2D panel. The 2D panel may be scaled arbitrarily within a specified range, and a pixel value of internal elements of the 2D panel remains unchanged. The ruler includes two types, i.e., a horizontal ruler and a vertical ruler, which are located on the left and top of the 2D panel respectively. The position of the 0 point is always consistent with the position of the upper left corner of the canvas. The 2D panel also includes a lock, which is located at the leftmost side of the horizontal ruler. When the lock is enabled, the reference line cannot be dragged, and the reference line cannot be dragged from the ruler. The reference line includes two types, i.e., a horizontal reference line and a vertical reference line. The reference line appears when the reference line is dragged from the ruler, and disappears after the reference line is dragged into the ruler. The width of the reference line is changed with the scaling of the 2D panel, and the position of the reference line with respect to the upper left corner of the canvas is displayed in real time when the reference line is dragged.

Step S105, dynamically select a tracking area based on a position of the anchor point of the sticker, where the tracking area is an image area in the target object. The tracking area is used to display an area corresponding to the tracking of the sticker in the background image. In order to obtain the tracking area, area segmentation is performed on the human face in the background image firstly, and the area segmentation is based on the key points identified on the human face. The number of the key points is at least three, usually is tens to hundreds.

In this embodiment, the human face is taken as the target object for setting analysis. Information of the key points of the human face can reflect the position and direction of the human face. Information of the key points includes information of internal feature key points and information of edge feature key points. Human face key point detection algorithm in this embodiment integrates structural information described by human face edge lines into the key point detection, which greatly improves a detection accuracy of the algorithm in extreme situations such as large profile faces, exaggerated expressions, occlusion, and blur. In this embodiment, coordinates of 106 key points of the human face is acquired with a human face key point algorithm provided by the lab. In the algorithm, common image feature information of the human face is captured to obtain a data set of human face key point detection. The data set is Wider Facial Landmarks in-the-wild (WFLW), contains key points and human face image data labeled with human face attributes. The data set includes transformations of poses, expressions, lighting, makeup, occlusion and blur, and aims to help the academic community to make more targeted evaluation of robustness of key point algorithms in various conditions. In principle, the number of the key points is not less than 3. If there are too few key points, feature representations of the target object in the image may be too few, which cannot accurately reflect the features of the target object, and the position of the target object cannot be accurately located. More key points lead to a more accurate feature representation of the target object, and results in a greater amount of calculation. Generally, the number of the key points is tens to hundreds. For example, the number of the key points may be 106 or 22 or 98 or 100 and so on.

Performing area segmentation on the human face (target object) in the background image includes: segmenting the human face (target object) into N triangular areas by using a triangulation algorithm of key point set, where N is a natural number.

Figure 4:
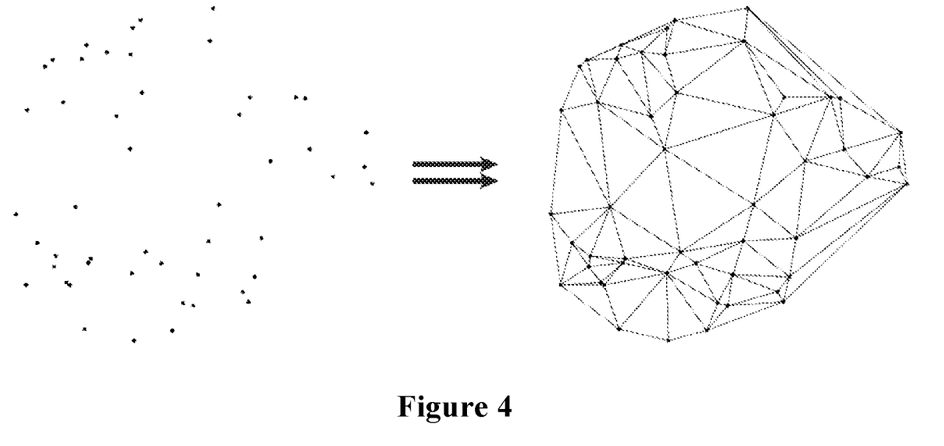
FIG. 4 is a schematic diagram shows segmentation of a triangulation algorithm (Delaunay) according to an embodiment of the disclosure.

FIG. 4 is a schematic diagram shows segmentation of a triangulation algorithm (Delaunay). As shown in the FIG. 4, the discrete key points are connected into Delaunay triangles according to the triangulation algorithm (Delaunay), and the target object is segmented into multiple triangle areas. The target object is segmented into N triangular areas by using a triangulation algorithm of point set, where N is a natural number.

The definition of Delaunay triangle is described as follows.

Triangulation: assume that V is a finite point set of a two-dimensional real number field, edge e is a closed line segment composed of points in the point set as the endpoints, and E is a set of e. Then a triangulation T=(V, E) of the point set V is a plane graph G, plane graph G meets the following conditions:

1. Except for the endpoints, the edges in the plan graph do not contain any points of the point set.

2. There are no intersecting edges.

3. All the faces in the plan graph are triangular faces, and the collection of all triangular faces is a convex hull of the discrete point set V.

The most commonly used triangulation in practice is Delaunay triangulation, which is a special triangulation. The description of the Delaunay triangulation starts with Delaunay edge.

Delaunay edge: assume that e is an edge (two endpoints of the edge are a, b) in E, edge e is called as a Delaunay edge if edge e meets a condition that, there is a circle passing through two points a and b, there is not any other points of the point set V inside the circle (note the definition of "inside the circle", and the maximum of the points of the point set V on the circle are three). This feature is also called the empty circle feature.

Delaunay triangulation: if a triangulation T of the point set V contains only Delaunay edges, the triangulation is called Delaunay triangulation.

Assuming that T is any triangulation of V, then T is a Delaunay triangulation of V only when an interior of a circumcircle of each triangle in T does not contain any point of V.

Regarding the algorithm of Delaunay triangles, there are flanging algorithm, point-by-point insertion algorithm, division and merging algorithm, Bowyer-Watson algorithm, etc.

This embodiment adopts a point-by-point insertion algorithm. In this algorithm, Delaunay triangles are mainly used. It is understood that no other point of the point set can exist in the circumcircle of each triangle.

The optimized pseudo code is:

```
input: vertex list (vertices)
//vertices is a random or out-of-order vertex list generated externally
    output: determined triangle list (triangles)
        initialize the vertex list
        create an index list (indices = new Array(vertices.length))
//the values in the indices array are 0,1,2,3,...,vertices.length-1
        sort the indices based on the x coordinates of the vertexes in the vertices
//the order of values in the indices after sorting is an ascending order of the x coordinates of the
vertexes(y coordinates of the vertexes may also be used, in this embodiment, x coordinates of
the vertexes are used)
        determine a super triangle
        save the super triangle to an undetermined triangle list (temp triangles)
        push the super triangle to the triangles list
        traverse each point in the vertices based on the order of the indices
//Based on the indices, the vertices appear in an ascending order of the x coordinates of the
vertexes
            initialize an edge buffer array (edge buffer)
            traverse each triangle in the temp triangles
                calculate a center and radius of the triangle
                if the point is on the right side of the circumcircle
                then the triangle is a Delaunay triangle, save the triangle to the triangles
                    remove the triangle from the temp
                    skip
                if the point is outside the circumcircle (that is, the point is not on the right
side of the circumcircle)
                    then the triangle is uncertain
                    skip
                if the point is within the circumcircle
                    then the triangle is not a Delaunay triangle
                    save three sides to the edge buffer
                    remove the triangle from the temp
            deduplicate the edge buffer
            combine the edges in the edge buffer and the current point into several
triangles and save the triangles to the temp triangles
            merge the triangles with the temp triangles
            remove triangles related to the super triangle
        end
```

In this way, a multi-triangular area complex formed by multiple key points may be obtained. In this embodiment, the 106 key points of the human face are obtained, and the human face is divided into 159 triangles (not shown) by using Delaunay.

The tracking area is a triangular area formed by three key points in the human face (target object). The tracking area is a triangular area containing the anchor point, in a case that the anchor point of the sticker is within the human face (target object). The tracking area is a triangular area formed by three key points within the human face (target object), in a case that the anchor point of the sticker is outside the human face (target object). In this case, the three key points are relatively fixed and can best reflect the feature of the target object. That is, two eyes and the end of the nose are selected as the three key points by default. The tracking area is updated in real time based on the position of the anchor point of the sticker on the canvas. The display of the tracking area includes two display modes, i.e., a mode in which point prompt is displayed and a mode in which point prompt is not displayed.

Figure 5A:
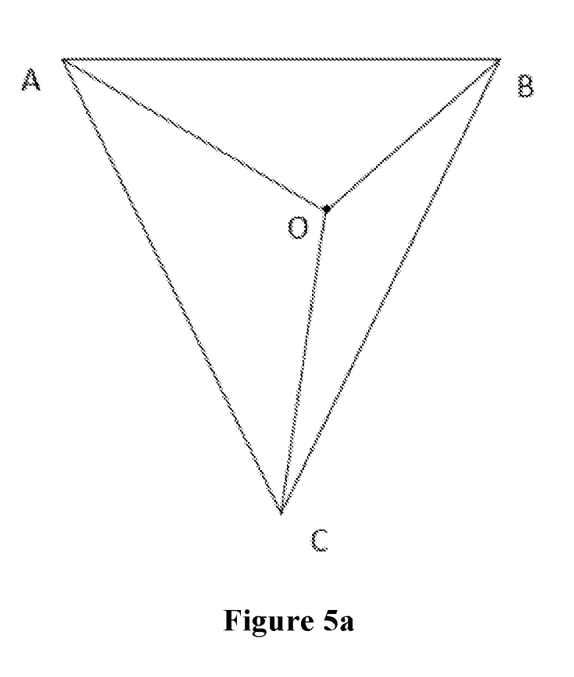
FIGS. 5*a* and 5*b* are schematic diagrams show a positional relationship of a triangular area formed by an anchor point and key points according to an embodiment of the disclosure.
Figure 5B:
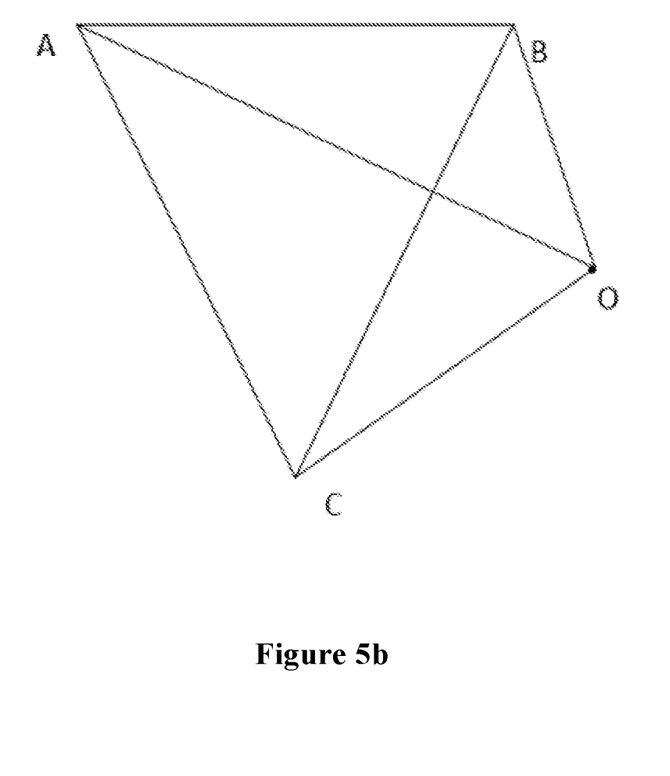

FIGS. 5a and 5b are schematic diagrams show a positional relationship of a triangular area formed by an anchor point and key points. As shown in FIGS. 5a and 5b, it is determined which triangle the anchor point is located in based on the coordinate of the anchor point of the sticker. Specific description is as follows.

Three key points are selected from the key points, an area of a large triangle formed by the three key points is calculated based on the coordinates of the three key points. An area of each of three small triangles formed by the anchor point and any two of the three key points is calculated, by using the Helen formula, based on the coordinates of the three key points and the coordinate of the anchor point. The anchor point is located inside the large triangle in a case that the sum of the areas of the three small triangles is equal to the area of the large triangle. The anchor point is located outside the large triangle in a case that the sum of the areas of the three small triangles is greater than the area of the large triangle.

The area of a triangle is calculated by using the Helen formula. For example, three key points used to form a triangle are A(x1, y1), B(x2, y2), and C(x3, y3), the side lengths of the formed triangle are a, b, and c. The area of the triangle is calculated by using the Helen formula as follows.

Calculate the area of the triangle $S_{ABC}=\text{sqrt}(p*(p-a)*(p-b)*(p-e))$, $S_{ABC}$ is the area of the triangle $ABC$          Helen formula where $a=\text{sqrt}((x1-x2)*(x1-x2)+(y1-y2)*(y1-y2))$;

$b=\text{sqrt}((x1-x3)*(x1-x3)+(y1-y3)*(y1-y3))$;

$c=\text{sqrt}((x3-x2)*(x3-x2)+(y3-y2)*(y3-y2))$;

$p=(a+b+c)/2$, $p$ is the half circumference of the triangle.

Similarly, the area of each of three small triangles formed by the anchor point and any two of the three key points may be calculated, to obtain the areas S1, S2, and S3 of the three small triangles. If S1+S2+S3=$S_{ABC}$, referring to FIG. 5a, the anchor point O is located inside the triangle ABC. If S1+S2+S3>$S_{ABC}$, referring to FIG. 5b, the anchor point O is located outside the triangle ABC.

The tracking area is determined based on the position relationship between the anchor point O and the triangle ABC obtained by the above method. In a case that the anchor point is within the target object, that is, a case that the anchor point O is located inside the triangle ABC, the tracking area is determined as the triangle area containing the anchor point, and the tracking area is updated in real time as the position of the anchor point changes.

Figure 6:
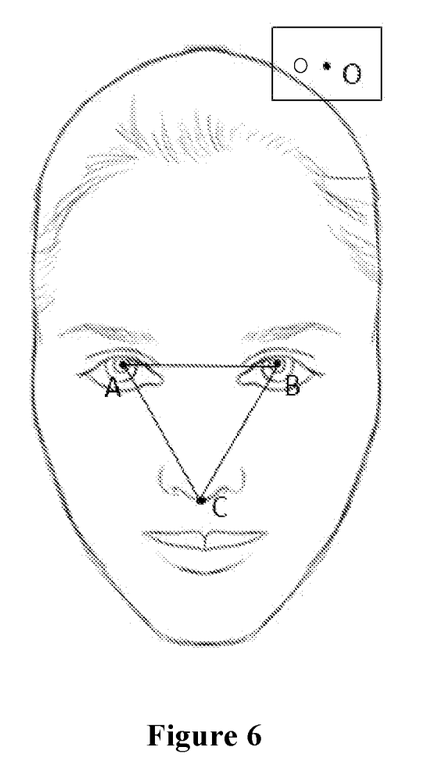
FIG. 6 is a schematic diagram shows a situation in which an anchor point is outside a target object according to an embodiment of the disclosure.

FIG. 6 is a schematic diagram shows a situation in which an anchor point is outside a target object. In a case that the position of the sticker is outside the target object (such as a human face), referring to FIG. 4, in a case that the anchor point is outside the target object, the three key points within the target object that are relatively fixed and can best reflect the feature of the target object are selected by default. In principle, any three key points with obvious features in the target object may be selected. For convenience and typicalness, when the target object is the face of a person and the anchor point is outside the human face, two eyes and the end of the nose are selected as three key points by default. Such three key points have obvious features, and the triangle formed by the three key points has a good face positioning performance, and the obtained position of the anchor point is more accurate.

Step S106, generate the sticker based on the display area, the tracking area, and the resource of the sticker. After a setting method, a setting position, and a size of the sticker are determined, the sticker may be updated in real time as the human face (target object) moves. The tracking area always changes with the movement of the anchor point of the sticker. A relative position of the sticker with respect to the human face (target object) is determined, so that the sticker changes with the change of the position of the human face in the video stream and remains at a specific position relative to the human face when the user takes a photo and adds the sticker. For example, if the stickers are cat ears, that is, two stickers form a horizontal mirror image, a cat ear sticker is automatically generated based on the setting method, the adjusted sticker size, and the relative position with respect to the human face. In addition, the sticker may be adjusted manually to meet personalized requirements.

Embodiment 2

Figure 7:
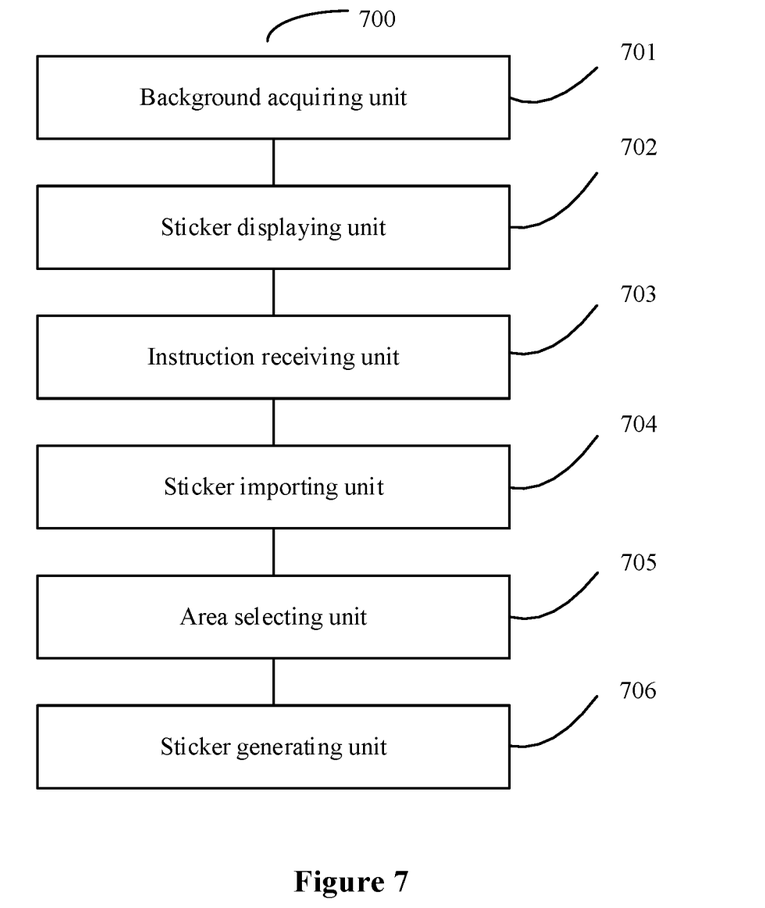
FIG. 7 is a structural diagram of a sticker generating device according to an embodiment of the disclosure.

In another aspect, as shown in FIG. 7, a sticker generating device 700 is provided according to an embodiment of the disclosure. The sticker generating device 700 includes a background acquiring unit 701, a sticker displaying unit 702, an instruction receiving unit 703, a sticker importing unit 704, an area selecting unit 705 and a sticker generating unit 706.

The background acquiring unit 701 is configured to acquire a background image, the background image includes a target object. The image in this embodiment may be a static picture, a dynamic picture, or a video stream or real-time video shooting. The image includes the target object on which a sticker special effect is to be set. Normally, the target object may be the face or head of a person or an animal. The image processing device receives an image acquisition instruction from a client, and then invokes an image or a camera device, to obtain the background image to be processed. The background image may be a stored picture or video, or a picture or video taken in real time, on which a sticker is to be set.

The sticker displaying unit 702 is configured to display a display area of a sticker and an anchor point of the sticker in the background image. In the embodiment of the disclosure, a human face is selected as the background image. The sticker effect is actually to paste some pictures on the human face, positions of these pictures are changed based on the position of the human face. The position of the sticker is dynamically adjusted based on a result of human face detection, to achieve a simple real-time dynamic sticker effect. The position of the sticker is determined based on the anchor point of the sticker, and the position of the sticker on a canvas is determined based on the position of the anchor point on the canvas, thereby determining a position of the sticker with respect to the background image. In this embodiment, the center point of a rectangular area where the sticker is located or an end point of the rectangular area is defined as the anchor point of the sticker. Coordinates of the anchor point in the image are set to be O(x0, y0), and the set anchor point may be dragged. The position of the anchor point may be set in advance according to the type of the sticker. The anchor point may be displayed in the 2D panel by using a representation of a common black point, a graph "⊙" formed by a circle and a center point or other graphs. Or, the anchor point may not be displayed. The position of the anchor point is used to locate the position of the sticker.

The instruction receiving unit 703 is configured to receive an import instruction for the sticker. The position of the sticker on the canvas is set by a user, the sticker may be moved arbitrarily within the canvas, and the sticker may be dragged and scaled arbitrarily within the canvas. Based on the obtained anchor point of the sticker, a sticker setting instruction sent by the client is received, and an initial position of the anchor point of the sticker is set by the user.

The initial position of the anchor point of the sticker refers to an initial coordinate O(x0, y0) of the anchor point. The set anchor point can be dragged, and the position of the anchor point may be set in advance based on a type of the sticker.

The sticker importing unit 704 is configured to import a resource of the sticker according to the import instruction and display the resource of the sticker in the display area of the sticker. The sticker is imported into the background image, and the sticker is displayed in the target object of the background image according to a setting instruction. For example, cat whisker stickers are displayed mirrored and symmetrically on both sides of the mouth. The cat whisker stickers correspond to two rectangular sticker display areas, the sticker display areas are located within the target object. In addition, cat ear stickers are displayed mirrored and symmetrically on both sides of the head. The cat ear stickers correspond to two rectangular sticker display areas, the sticker display areas are located outside the target object. The stickers may be various, such as cat ears, cat whiskers, rabbit ears, horns, hats, decorations, graffiti. The type of the sticker includes a single picture and a sequence of frame animations. The display mode of the sticker is one of forward display, reverse display, display depending on angle, horizontal mirror display, and vertical mirror display. One or more stickers may be set. Multiple stickers may be set with a display mode of the horizontal mirror display or the vertical mirror display. Multiple stickers may also be rotated arbitrarily for a certain angle, that is the stickers are set with a certain angle of inclination. If the background image is a video, setting of a time sequence of the stickers may be made based on the time sequence of frames of the video. Of course, the setting has a certain degree of freedom and personalization.

The area selecting unit 705 is configured to dynamically select a tracking area based on a position of the anchor point of the sticker, the tracking area is an image area in the target object. The tracking area is used to display an area corresponding to the tracking of the sticker in the background image. In order to obtain the tracking area, area segmentation is performed on the human face in the background image firstly, and the area segmentation is based on the key points identified on the human face. The number of the key points is at least three, usually is tens to hundreds. In this embodiment, the human face is taken as the target object for setting analysis. Information of the key points of the human face can reflect the position and direction of the human face. Information of the key points includes information of internal feature key points and information of edge feature key points. Human face key point detection algorithm in this embodiment integrates structural information described by human face edge lines into the key point detection, which greatly improves a detection accuracy of the algorithm in extreme situations such as large profile faces, exaggerated expressions, occlusion, and blur. In this embodiment, coordinates of 106 key points of the human face is acquired with a human face key point detection algorithm. In principle, the number of the key points is not less than 3. If there are too few key points, feature representations of the target object in the image may be too few, which cannot accurately reflect the features of the target object, and the position of the target object cannot be accurately located. A more number of the key points leads to a more accurate feature representation of the target object, and results in a greater amount of calculation. Generally, the number of the key points is tens to hundreds. Performing area segmentation on the human face (target object) in the background image includes: segmenting the human face (target object) into N triangular areas by using a triangulation algorithm of key point set, where N is a natural number. The tracking area is a triangular area formed by three key points in the human face (target object). The tracking area is a triangular area containing the anchor point, in a case that the anchor point of the sticker is within the human face (target object). The tracking area is a triangular area formed by three key points within the human face (target object), in a case that the anchor point of the sticker is outside the human face (target object). In this case, the three key points are relatively fixed and can best reflect the feature of the target object. That is, two eyes and the end of the nose are selected as the three key points by default. The tracking area is updated in real time based on the position of the anchor point of the sticker on the canvas.

The sticker generating unit 706 is configured to generate the sticker based on the display area, the tracking area, and the resource of the sticker. After a setting method, a setting position, and a size of the sticker are determined, the sticker may be updated in real time as the human face (target object) moves. The tracking area always changes with the movement of the anchor point of the sticker. A relative position of the sticker with respect to the human face (target object) is determined, so that the sticker changes with the change of the position of the human face in the video stream and remains at a specific position relative to the human face when the user takes a photo and adds the sticker. For example, if the stickers are cat ears, that is, two stickers form a horizontal mirror image, a cat ear sticker is automatically generated based on the setting method, the adjusted sticker size, and the relative position with respect to the human face. In addition, the sticker may be adjusted manually to meet personalized requirements.

Further, the device further includes an anchor point acquiring unit configured to acquire the anchor point of the sticker, where the anchor point is used to locate the sticker. The position of the anchor point of the sticker is set to be a center point of the display area of the sticker or a vertex position of the display area. Coordinates of the anchor point in the image are set to be O(x0, y0), and the set anchor point may be dragged. The position of the anchor point may be set in advance according to the type of the sticker. This embodiment describes how to set a position of an anchor point with respect to the target object, and update the position of the anchor point in real time. If multiple stickers are set, multiple anchor points need to be set.

Further, the device further includes a key point acquiring unit and an area segmenting unit.

The key point acquiring unit is configured to acquire the target object in the background image and key points of the target object, where the key points are used to define the tracking area. Human face key point detection algorithm in this embodiment integrates structural information described by human face edge lines into the key point detection, coordinates of 106 key points of the human face is acquired with a human face key point detection algorithm. In the algorithm, common image feature information of the human face is captured to obtain a data set of human face key point detection. The data set is Wider Facial Landmarks in-the-wild (WFLW), contains key points and human face image data labeled with human face attributes. The data set includes transformations of poses, expressions, lighting, makeup, occlusion and blur, and aims to help the academic community to make more targeted evaluation of robustness of key point algorithms in various conditions. In principle, the number of the key points is not less than 3. If there are too few key points, feature representations of the target object in the image may be too few, which cannot accurately reflect the features of the target object, and the position of the target object cannot be accurately located. A more number of the key points leads to a more accurate feature representation of the target object, and results in a greater amount of calculation. Generally, the number of the key points is tens to hundreds. For example, the number of the key points may be 106 or 22 or 98 or 100 and so on.

The area segmenting unit is configured to perform area segmentation on the target object based on the key points. Performing area segmentation on the human face (target object) in the background image includes: segmenting the human face (target object) into N triangular areas by using a triangulation algorithm of key point set, where N is a natural number. FIG. 4 is a schematic diagram shows segmentation of a triangulation algorithm (Delaunay).

Further, the device further includes an area selecting unit configured to dynamically select an image area in the target object in real time based on the anchor point of the sticker. The tracking area is determined based on the position relationship between the anchor point O and the triangle ABC obtained by the above method. In a case that the anchor point is within the target object, that is, a case that the anchor point O is located inside the triangle ABC, the tracking area is determined as the triangle area containing the anchor point, and the tracking area is updated in real time as the position of the anchor point changes. In a case that the position of the anchor point of the sticker is outside the target object (such as a human face), the three key points within the target object that are relatively fixed and can best reflect the feature of the target object are selected by default. In principle, any three key points with obvious features in the target object may be selected. For convenience and typicalness, when the target object is the face of a person and the anchor point is outside the human face, two eyes and the end of the nose are selected as three key points by default. Such three key points have obvious features, and the triangle formed by the three key points has a good face positioning performance, and the obtained position of the anchor point is more accurate.

Embodiment 3

An electronic device is provided according to an embodiment of the disclosure. The electronic device is used for performing the sticker generating method. The electronic device includes at least one processor; and a memory communicatively connected with the at least one processor. The memory stores instructions executable by the at least one processor. The instructions, when executed by the at least one processor, cause the at least one processor to: acquire a background image, where the background image includes a target object; display a display area of a sticker and an anchor point of the sticker in the background image; receive an import instruction for the sticker; import a resource of the sticker according to the import instruction and display the resource of the sticker in the display area of the sticker; dynamically select a tracking area based on a position of the anchor point of the sticker, where the tracking area is an image area in the target object; and generate the sticker based on the display area, the tracking area, and the resource of the sticker.

Embodiment 1 may be referred for specific processing methods.

Figure 8:
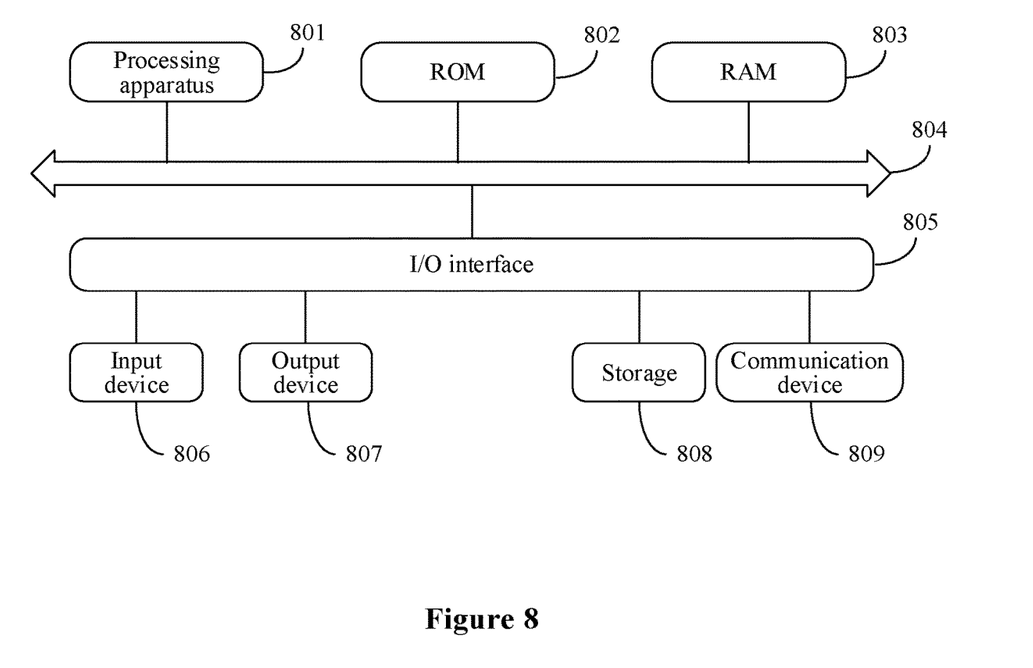
FIG. 8 is a schematic diagram shows a connection structure of an electronic device according to an embodiment of the disclosure.

Reference is made to FIG. 8, which is a schematic structural diagram of an electronic device 800 suitable for implementing the embodiments of the disclosure. The electronic device according to the embodiments of the disclosure may include, but are not limited to, mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs, desktop computers, etc. The electronic device shown in FIG. 8 is only exemplary, and should not indicate any limitation to the function and the application scope of the embodiments of the disclosure.

As shown in FIG. 8, the electronic device 800 may include a processing apparatus 801 (such as a central processing unit or a graphics processor), which may execute various operations and processing based on a program stored in a Read Only Memory (ROM) 802 or a program loaded from a storage 808 into a Random Access Memory (RAM) 803. The RAM 803 is further configured to store various programs and data required by the electronic device 800. The processing apparatus 801, the ROM 802 and the RAM 803 are connected to each other through a bus 804. An Input/output (I/O) interface 805 is also connected to the bus 804.

Generally, the I/O interface 805 may be connected to: an input device 806, such as a touch screen, a touch panel, a keyboard, a mouse, an image sensor, a microphone, an accelerometer, and a gyroscope; an output device 807, such as a liquid crystal display (LCD), a speaker, and a vibrator; a storage 808 such as a magnetic tape and a hard disk; and a communication device 809. The communication device 809 enables wireless or wired communication between the electronic device 800 and other devices for data exchanging. Although FIG. 8 shows an electronic device 800 having various components, it should be understood that the illustrated components are not necessarily required to all be implemented or embodied. Alternatively, more or fewer devices may be implemented or included.

Particularly, according to an embodiment of the disclosure, the process described above in conjunction with flow charts may be implemented as a computer program. For example, a computer program product is further provided by an embodiment in the disclosure, including a computer program carried on a computer readable medium. The computer program includes program code for performing the method shown in the flowchart. In the embodiment, the computer program may be downloaded and installed from the network via the communication device 809, or installed from the storage 808, or installed from the ROM 802. When the computer program is executed by the processing device 801, the functions defined in the method according to the embodiment of the disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the disclosure, the computer readable storage medium may be any tangible medium containing or storing a program, and the program may be used by or in combination with an instruction execution system, apparatus, or device. In the disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, radio frequency (RF) and the like, or any proper combination thereof.

The computer readable medium may be incorporated in the electronic device, or may exist alone without being assembled into the electronic device.

The computer readable medium contains one or more programs. The one or more programs, when executed by the electronic device, cause the electronic device to: acquire a background image, where the background image includes a target object; display a display area of a sticker and an anchor point of the sticker in the background image; receive an import instruction for the sticker; import a resource of the sticker according to the import instruction and display the resource of the sticker in the display area of the sticker; dynamically select a tracking area based on a position of the anchor point of the sticker, where the tracking area is an image area in the target object; and generate the sticker based on the display area, the tracking area, and the resource of the sticker.

The computer program code for performing the operations disclosed in the disclosure may be written in one or more programming languages or combinations thereof. The programming languages include an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block charts in the drawings illustrate the architecture, functions and operations that can be implemented by the system, method and computer program product according to the embodiments of the disclosure. Each block in a flowchart or a block diagram may represent a module, a program segment, or a part of code, and part of the module, program segment, or part of code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It is to be noted that each block in a block diagram and/or flowchart, and a combination of the blocks in a block diagram and/or flowchart, may be implemented by a dedicated hardware-based system that performs the specified functions or operations, or may be realized by a combination of dedicated hardware and computer instructions.

The units mentioned in the description of the embodiments of the disclosure may be implemented by means of software, or otherwise by means of hardware. In some circumstances, name of a unit does not constitute a limitation on the unit itself.

The above description includes merely preferred embodiments of the disclosure and explanations of technical principles used. Those skilled in the art should understand that the scope of the disclosure is not limited to technical solutions formed by a specific combination of the above technical features, but covers other technical solutions formed by any combination of the above technical features or equivalent features thereof without departing from an inventive concept of the disclosure. For example, a technical solution formed by interchanging the above features and technical features having similar functions as disclosed, but not limited to, in the disclosure with each other is also covered with the scope of the disclosure.

The invention claimed is:

1. A sticker generating method, comprising:
  acquiring a background image, wherein the background image comprises a target object;
  displaying a display area of a sticker and an anchor point of the sticker in the background image;
  receiving an import instruction for the sticker;
  importing a resource of the sticker according to the import instruction and displaying the resource of the sticker in the display area of the sticker;
  dynamically selecting a tracking area based on a position of the anchor point of the sticker, wherein the tracking area is an image area in the target object; and
  generating the sticker based on the display area, the tracking area, and the resource of the sticker.

2. The method according to claim 1, wherein the position of the anchor point of the sticker is set to be a center point of the display area of the sticker or a vertex position of the display area.

3. The method according to claim 1, further comprising:
  acquiring key points of the target object in the background image;
  performing area segmentation on the target object based on the key points.

4. The method according to claim 3, wherein the number of the key points of the target object is at least three.

5. The method according to claim 4, wherein the performing area segmentation on the target object comprises:
  segmenting the target object into N triangular areas by using a triangulation algorithm of point set, wherein N is a natural number.

6. The method according to claim 5, wherein the tracking area is a triangular area formed by three key points in the target object corresponding to the anchor point.

7. The method according to claim 6, wherein the tracking area is a triangular area containing the anchor point in a case that the anchor point of the sticker is within the target object.

8. The method according to claim 6, wherein the tracking area is a triangular area formed by three fixed key points within the target object in a case that the anchor point of the sticker is outside the target object.

9. The method according to claim 8, wherein, the three fixed key points are pupils of two eyes and an end of the nose and the tracking area is a triangular area formed by the pupils of the two eyes and the end of the nose, in a case that the target object is a face of a person and the anchor point is outside the face.

10. The method according to claim 1, wherein the resource of the sticker comprises a type of the sticker and a display mode of the sticker.

11. The method according to claim 10, wherein the type of the sticker comprises a single picture and a sequence of frame animations; and the display mode of the sticker is one of forward display, reverse display, display depending on angle, horizontal mirror display, and vertical mirror display.

12. The method according to claim 1, further comprising:
updating, based on a position of the anchor point of the sticker on a canvas, the tracking area in real time.

13. The method according to claim 12, further comprising:
receiving a position adjustment and size scaling instruction for the sticker, to drag and scale arbitrarily the sticker within the canvas.

14. A sticker generating device, comprising:
one or more processors; and
a memory communicatively connected with the one or more processors and storing one or more programs, wherein the one or more programs, when executed by the one or more processors, cause the one or more processors to implement operations comprising:
acquiring a background image, wherein the background image comprises a target object;
displaying a display area of a sticker and an anchor point of the sticker in the background image;
receiving an import instruction for the sticker;
importing a resource of the sticker according to the import instruction and display the resource of the sticker in the display area of the sticker;
dynamically selecting a tracking area based on a position of the anchor point of the sticker, wherein the tracking area is an image area in the target object; and
generating the sticker based on the display area, the tracking area, and the resource of the sticker.

15. The device according to claim 14, wherein the one or more programs, when executed by the one or more processors, cause the one or more processors to implement an operation comprising:
acquiring the anchor point of the sticker, wherein the anchor point is used to locate the sticker.

16. The device according to claim 14, wherein the one or more programs, when executed by the one or more processors, cause the one or more processors to implement an operation comprising:
acquiring the target object in the background image and key points of the target object, wherein the key points are used to define the tracking area.

17. The device according to claim 16, wherein the one or more programs, when executed by the one or more processors, cause the one or more processors to implement an operation comprising:
performing area segmentation on the target object based on the key points, to segment the target object into N triangular areas, wherein N is a natural number.

18. The device according to claim 14, wherein the one or more programs, when executed by the one or more processors, cause the one or more processors to implement an operation comprising:
dynamically selecting an image area in the target object in real time based on the anchor point of the sticker.

19. A non-transitory computer-readable storage medium storing a computer program, wherein the computer program, when executed by a processor, implements the operations comprising:
acquiring a background image, wherein the background image comprises a target object;
displaying a display area of a sticker and an anchor point of the sticker in the background image;
receiving an import instruction for the sticker;
importing a resource of the sticker according to the import instruction and displaying the resource of the sticker in the display area of the sticker;
dynamically selecting a tracking area based on a position of the anchor point of the sticker, wherein the tracking area is an image area in the target object; and
generating the sticker based on the display area, the tracking area, and the resource of the sticker.

* * * * *